United States Patent [19]

Heald et al.

[11] Patent Number: 5,000,613
[45] Date of Patent: Mar. 19, 1991

[54] SHAFT COUPLING WITH ALIGNMENT ADJUSTMENT DEVICE

[75] Inventors: Charles C. Heald, Nazareth; John P. Gamlin, Easton, both of Pa.

[73] Assignee: Ingersoll-Rand Company, Woodcliff Lake, N.J.

[21] Appl. No.: 464,574

[22] Filed: Jan. 8, 1990

Related U.S. Application Data

[63] Continuation of Ser. No. 253,117, Oct. 4, 1988, abandoned.

[51] Int. Cl.[5] .............................................. F16B 7/04
[52] U.S. Cl. .................................. 403/312; 403/313; 403/362
[58] Field of Search ............... 403/310, 312, 306, 305, 403/300, 320, 362, 313, 286, 13

[56] References Cited

U.S. PATENT DOCUMENTS

| | | | |
|---|---|---|---|
| 1,647,802 | 11/1927 | Joset | 403/305 |
| 3,554,589 | 1/1971 | Boggs | 403/313 |
| 3,583,356 | 6/1971 | Barker | 403/312 X |
| 3,603,624 | 9/1971 | Attermeyer | 403/300 |
| 4,068,965 | 1/1978 | Lichti | 403/313 |
| 4,217,061 | 8/1980 | Eiland et al. | 403/313 |
| 4,314,771 | 2/1982 | Lambert | 403/362 X |
| 4,623,278 | 11/1986 | Merrell | 403/362 |
| 4,657,429 | 4/1987 | Morris | 403/362 |
| 4,699,345 | 10/1987 | Cole | 403/362 X |
| 4,846,762 | 7/1989 | Betterton et al. | 403/300 X |

*Primary Examiner*—Peter M. Cuomo
*Attorney, Agent, or Firm*—David W. Tibbott

[57] ABSTRACT

A centrifugal pump mounted in a pipeline with its driven shaft extending vertically and a driving motor spaced above the pump on a support frame attached to the pump body and supporting the motor. The shafts of the motor and pump are vertically aligned and interconnected by a coupling that enables the end portion of one shaft to be swiveled in the coupling to adjust the alignment of the shaft axis with the axis of the other shaft and threaded screws for forcing the shaft end to an adjusted position and locking it in the adjusted position during use of the pump.

10 Claims, 1 Drawing Sheet

SHAFT COUPLING WITH ALIGNMENT ADJUSTMENT DEVICE

This Application is a continuation of Application Ser. No. 07/253,117, filed Oct. 4, 1988, now abandoned.

BACKGROUND OF THE INVENTION

This invention relates to a coupling for rigidly interconnecting the shafts of rotating machinery in axial alignment and more particularly to a coupling containing means for adjusting the axial alignment of a pair of axially aligned shafts interconnected by the coupling.

Two general types of couplings are used for interconnecting the shafts of rotating machinery. One type is known as a "flexible coupling". In using a flexible coupling, each piece of machinery includes a bearing support system that independently and completely supports its rotating shaft without the need of additional support from outside of the machinery. The shafts of such machinery are interconnected by the flexible coupling that absorbs any misalignment of the shafts. The designers of such machinery attempt to position the machinery with the shafts in axial alignment but recognize that the machinery may not be in exact axial alignment or may move out of axial alignment after installation. Such misalignment is handled by the flexible coupling allowing the machinery to operate without the need for the shafts to be in perfect axial alignment.

The second type of coupling is known as a "rigid coupling". A rigid coupling is normally used in the situation where the bearing support system for one of the pieces of machinery is inadequate to fully and independently support the shaft of such machinery by itself and relies on the bearing support system of the interconnected piece of machinery. In using the rigid coupling, the two pieces of machinery are connected together by a means such as a common support system which anchors the two pieces of machinery in fixed relationship relative to each other and the shafts are interconnected by the rigid coupling with the intention that they be in good axial alignment. However, the shafts are not always in perfect alignment and frequently much effort is expended to insure that the shafts are in axial alignment and remain in such alignment during use of the machinery. The alignment problems with a rigid coupling are more likely to arise as the distance between the interconnected machinery becomes greater. This invention relates to a rigid coupling.

SUMMARY OF THE INVENTION

An object of this invention is to provide a rigid coupling for rigidly interconnecting the rotating shafts of machinery together in axial alignment and including means for adjusting the axial alignment of such shafts when necessary and locking the shafts in the finally adjusted relative position to prevent them from moving out of such alignment position during operation.

Another object of the invention is to provide a shaft coupling of the rigid type which allows the end portion of one shaft to swivel in the coupling and contains plural adjustment members spaced around the end portion of the one shaft to move the end portion of the shaft to a swiveled position relative to the coupling and to the axis of the other shaft engaged in the coupling.

BRIEF DESCRIPTION OF THE DRAWING

FIG. 1 is vertical section of a centrifugal pump located in a pipeline with its driven shaft extending vertically upward and connected by the coupling of this invention to a motor mounted above the pump on a frame supported on the pump body with its driving shaft extending vertically downward in line with the axis of the pump shaft.

FIG. 2 is an enlarged perspective view of the coupling of this invention with portions being cut away to show the details of the connection between the coupling and the shafts.

FIG. 3 is a section taken on line 3—3 in FIG. 2.

FIG. 4 is a section taken on line 4—4 in FIG. 2.

DESCRIPTION OF PREFERRED EMBODIMENT

The pump 1 shown in the drawings is a centrifugal pump and is known in the industry as a vertical inline type of pump. The pump 1 includes a casing 6 having an inlet 7 and an outlet 8 adapted to be connected to the spaced ends of a pipeline (not shown) which usually supports the pump 1. The pump 1 is conventional and includes a centrifugal impeller 9 rotating in a pump chamber 10 connected to the inlet 7 and outlet 8. The pump impeller 9 is mounted on the lower end of a shaft 11 extending vertically upward from the impeller 9 and is supported in a bushing 12 and a seal 13 mounted in the pump casing 6.

The pump 1 is driven by a driver such as the electric motor 15 mounted with its shaft 16 extending vertically downward in line with the pump shaft 11. It should be recognized that the driving means could be another type of driver such as, for example, a steam turbine and that the invention is not limited to any particular type of driving means. The motor 15 includes an end plate 17 surrounding the shaft 16 and mounted on a support frame 20 located between the pump 1 and the motor 15. The support frame 20 includes several vertical legs 21 extending between a top ring 22 and a bottom ring 23. The bottom ring 23 of the support frame 20 sits on and is bolted to the casing 6 of pump 1 and the top ring 22 is bolted to the end plate 17 of the motor 15, resulting in the motor 15, support frame 20 and pump 1 being integrated into a single rigid unit which is intended to hold the two shafts 11 and 16 in axial alignment.

Figures 1, 2, 3, 4:
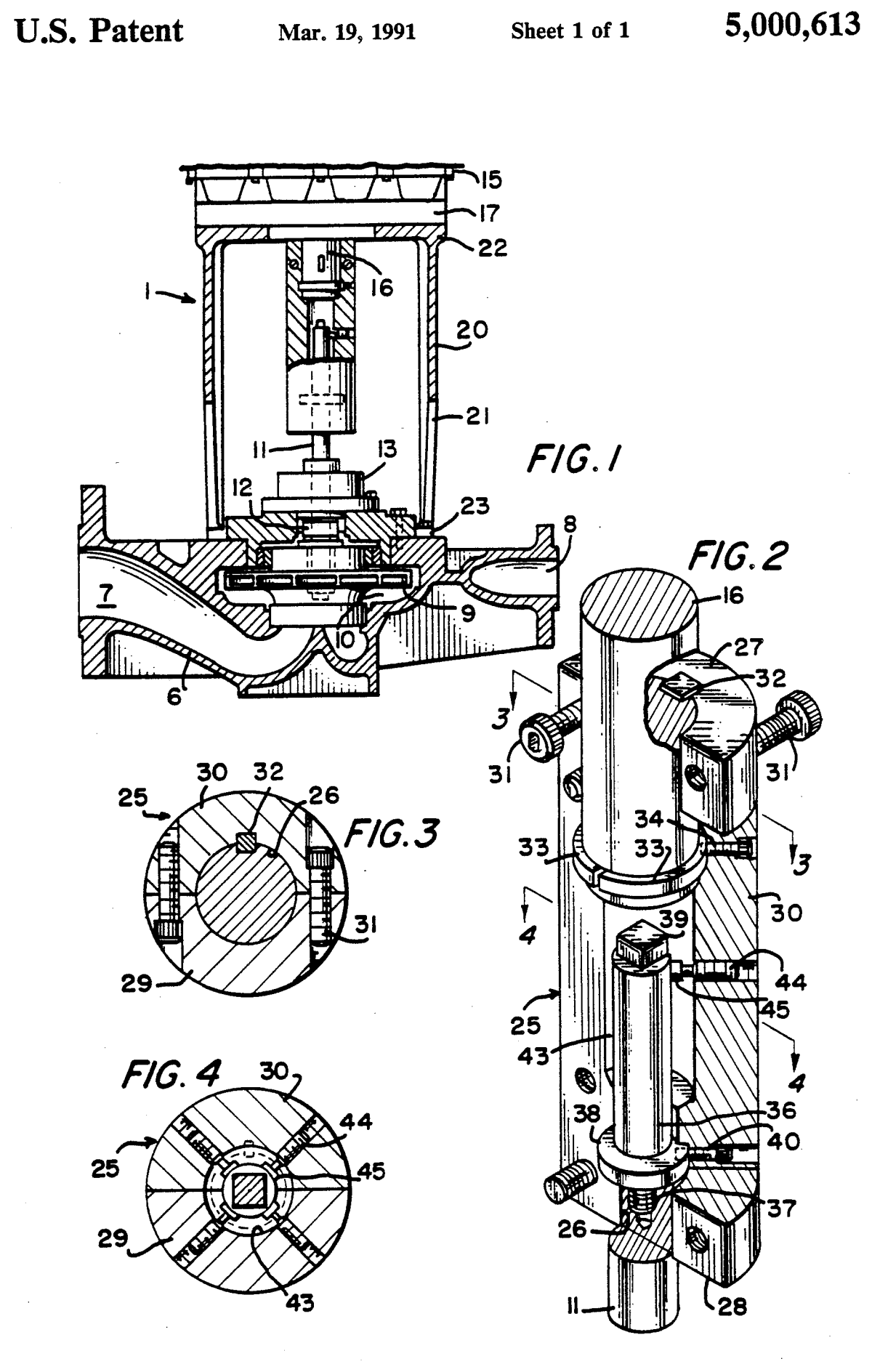

The two shafts 11 and 16 are interconnected by a coupling 25 which is an embodiment of this invention. The coupling 25 includes an elongate cylindrical body, also designated 25, having a bore 26 extending between its upper end 27 and lower end 28. The coupling 25 is split axially into a pair of semi-arcuate halves 29 and 30 which when installed are held together by bolts 31 located at both ends of the coupling and extending between the halves 29 and 30 as shown in FIG. 2. The two halves 29 and 30 are clamped together around the ends of the pump and motor shafts 11 and 16 to interconnect the shafts together for transmitting driving torque from the motor 15 to the pump 1.

Both the shafts 11 and 16 are keyed to the coupling 25 by keys 32 in a conventional manner. The motor shaft 16 includes an annular groove near its lower end which receives a pair of ring sections 33 that fit into a corresponding internal annular groove in the coupling 25 for locking the shaft 16 axially in the coupling 25. One of the ring sections 33 is locked in place in the coupling 25 by a screw 34 extending through a bore in the coupling half 30 and threading into the corresponding ring section 33.

A shaft extension 36 is fixed to the upper end of the pump shaft 11 by means of a threaded portion 37 on the extension 36 received in a corresponding threaded hole in the end of the shaft 11. A washer 38 is located between the extension 36 and the shaft 11 with the threaded portion 37 of the extension 36 extending through the washer 38. The washer 38 is larger than the shaft 11 and is received in an internal groove formed in the coupling 25 to axially lock the pump shaft 11 in the coupling 25 in the same manner that the ring sections 33 lock the shaft 16 axially in the coupling 25. The upper or outer end of the shaft extension 36 is formed with wrench engaging flats 39 to enable the use of a wrench for threading the extension 36 in place on the end of shaft 11. The washer 38 is held in position by a screw 40 extending through a bore in the coupling half 30 and threading into the periphery of the washer 38.

The bore 26 of the coupling 25 is enlarged midway of its length to form the chamber 43 receiving the shaft extension 36. The majority of the shaft extension 36 is located in the chamber 43 where it is spaced from the walls of the chamber 43 so that it can be moved side-to-side. The remainder of the shaft 11 and the extension 36 is held by the coupling 25 over a relatively small length of the coupling 25 so that the portion of the coupling 25 holding the shaft 11 and extension 36 serves as a fulcrum about which the shaft 11 and shaft extension 36 can pivot as the upper end of the shaft extension 36 is moved from side-to-side in the chamber 43. Moving the shaft extension 36 in the chamber 43 can serve to change the alignment of the shaft 11 in relation to the coupling 25.

Means is provided for moving the shaft extension 36 in the chamber 43 and locking the shaft extension 36 in place after the completion of the adjustment. As shown in FIG. 4, four headless adjustment screws 44, similar to set screws, are threaded in the walls of the coupling 25 at ninety degrees relative to each other about the shaft extension 36. Each screw 44 is formed on its outer end for engagement by a turning tool such as, for example, an allen wrench and includes a pad 45 on its inner end for engaging the side of the shaft extension 36. Each pad 45 is larger than the threaded portion of the screw 44 so that the screw 44 must be inserted into its threaded hole from the inside of the coupling 25 prior to being installed around the shafts 11 and 16. Making the pads 45 larger than the threaded holes prevents the screws 44 from accidently backing out of their holes during use, in the event they become loose, which is not supposed to happen, but may occur under unusual and unexpected circumstances.

It should be seen now that the screws 44 can be used to adjust the relative position of the shaft extension 36, and its connected shaft 11, in the chamber 43 to adjust the alignment of the shaft 11 relative to the shaft 16 for aligning the shafts after the coupling 25 is mounted on the shafts. In addition, the screws 44 serve to lock the shaft 11 in its relative position to the coupling 25 during the following operation of the pump 1 and motor 15.

The screw 34 is used to hold the coupling half 30 in place on the shaft 16 during assembly of the coupling and the screw 40 holds the coupling half 30 on the shaft 11 during assembly. The screws 34 and 40 remain in place during operation of the coupling although they only serve a function during assembly and disassembly of the coupling 25.

While only one embodiment of this invention is shown and described in detail, this invention is not limited merely to the specifically described embodiment, but contemplates other embodiments and variations utilizing the concepts and teachings of this invention.

We claim:

1. A coupling for interconnecting a pair of axially aligned rotating shafts together for rotating with said aligned rotating shafts and transmitting torque from one shaft to the other shaft, said coupling comprising an elongate cylindrical body having an axial bore therein extending over its length adapted to receive the adjacent ends of both shafts in substantial axial alignment, means for keying the ends of each shaft to the adjacent coupling body for causing the body to rotate with said shafts and to transmit torque between said shafts through said coupling body, fulcrum means on said coupling for firmly grasping one of said shafts at a point spaced from its end over a relatively short distance along the length of the coupling, a portion of the bore of said body being enlarged and spaced from said fulcrum means and being substantially larger than the end of said one shaft whereby said one shaft can tilt along its length about the fulcrum means of said coupling allowing the axis of said one shaft to tilt to an inclined position relative to the axis of the coupling body and means in said coupling body for engaging the end of said one shaft and urging it to said inclined position relative to the axis of said coupling body for adjusting said one shaft relative to the coupling to change the relative axial alignment between the two shafts and to lock the one shaft in the changed axial alignment position.

2. The coupling of claim 1 wherein said coupling body is split along its axis into a pair of semi-arcuate halves and fastener means is provided to clamp said halves together around the portions of the axially aligned shafts.

3. The coupling of claim 2 wherein the means for engaging and urging the end of said one shaft to an axially adjusted position includes several screws threaded into the coupling body at spaced locations around said one shaft and having means on their ends to engage said one shaft.

4. The coupling of claim 3 wherein the means on the ends of said screws are larger than the threaded holes receiving said screws thereby preventing said screws from backing completely out of said threaded holes during operation of the coupling.

5. The coupling of claim 4 wherein said one shaft includes a shaft extension removably attached to its end and extending into the enlarged portion of said bore and with the adjustment screws engaging said shaft extension.

6. An interconnection mechanism for connecting a rotary driver to a driven machine comprising: a rotary driving shaft carried by the driver and a second rotary shaft carried by the driven machine and axially aligned with the first shaft carried by the driver and adapted to be driven by said first shaft, a coupling for interconnecting said pair of axially aligned rotating shafts together for rotating with said shafts and transmitting torque from the driving shaft to the driven shaft, said coupling including an elongate cylindrical body having an axial bore therein extending over its length adapted to receive the adjacent ends of both shafts in substantial axial alignment, means for keying the ends of each shaft to the adjacent coupling body for causing the body to rotate with said shafts and to transmit torque between said shafts through said coupling body, fulcrum means on said coupling for firmly grasping one of said shafts at a point spaced from its end over a relatively short distance along the length for the coupling, a portion of the bore of said body being enlarged and spaced from said fulcrum means and being substantially larger than the end of said one shaft whereby said one shaft can tilt along its length about the fulcrum means of said coupling allowing the axis of said one shaft to tilt to an inclined position relative to the axis of the coupling body and means in said coupling body for engaging the end of said one shaft and urging it to said inclined position relative to the axis of said coupling body for adjusting said one shaft relative to the coupling to change the relative axial alignment between the two shafts and to lock the one shaft in the changed axial alignment position.

7. The coupling of claim 6 wherein said coupling body is split along its axis into a pair of semi-arcuate halves and fastener means is provided to clamp said halves together around the portions of axially aligned shafts.

8. The coupling of claim 7 wherein the means for engaging and urging the end of said one shaft to an axially adjusted position includes several screws threaded into the coupling body at spaced locations around said one shaft and having means on their ends to engage said one shaft.

9. The coupling of claim 8 wherein the means on the ends of said screws are larger than the threaded holes receiving said screws thereby preventing said screws from backing completely out of said threaded holes during operation of the coupling.

10. The coupling of claim 9 wherein said one shaft includes a shaft extension removably attached to its end and extending into the enlarged portion of said bore and with the adjustment screws engaging said shaft extension.

* * * * *